United States Patent [19]

Kalvenes et al.

[11] Patent Number: 4,842,075
[45] Date of Patent: Jun. 27, 1989

[54] SUBSEA FLOWLINE CONNECTION SYSTEM

[75] Inventors: Bjorn K. Kalvenes, Slependen; Oyvind Guthormsen, Hovik; Troels Erstad, Oslo, all of Norway

[73] Assignees: Mobil Oil Corporation; Kvaerner Engineering A.S.; Den Norske Stats Oljeselskap A.S., both of Norway

[21] Appl. No.: 196,395

[22] Filed: May 19, 1988

[30] Foreign Application Priority Data

Jun. 9, 1987 [NO] Norway .................. 872399

[51] Int. Cl.$^4$ ........................................ E21B 43/013
[52] U.S. Cl. ..................... 166/341; 166/343; 166/347; 405/169; 285/26
[58] Field of Search ............... 166/338, 341–344, 166/347; 405/158, 169–173, 195; 285/24, 26, 27, 29

[56] References Cited

U.S. PATENT DOCUMENTS

| 3,775,986 | 12/1973 | Daughtry | 61/72.3 |
|---|---|---|---|
| 4,004,635 | 1/1977 | Marquaine et al. | 405/169 X |
| 4,086,778 | 5/1978 | Latham et al. | 61/110 |
| 4,161,367 | 7/1979 | Cuiper et al. | 166/347 X |
| 4,367,980 | 1/1983 | Ames et al. | 405/169 |
| 4,437,521 | 3/1984 | Richardson et al. | 166/341 |
| 4,518,042 | 5/1985 | Miller | 166/347 |
| 4,580,636 | 4/1986 | Johnson, III et al. | 166/347 X |
| 4,591,292 | 5/1986 | Stevens et al. | 166/347 X |
| 4,615,646 | 10/1986 | Langner | 166/347 X |
| 4,620,818 | 11/1986 | Langner | 405/169 |
| 4,641,998 | 2/1987 | Baugh | 405/169 |
| 4,693,636 | 9/1987 | Fraser, Jr. et al. | 166/347 X |

Primary Examiner—Bruce M. Kisliuk
Attorney, Agent, or Firm—Alexander J. McKillop; Charles J. Speciale

[57] ABSTRACT

A subsea flowline connection system wherein a terminal connector on a flowline is pulled by a cable into a funnel on a connector base structure. The upper and lower 5 surfaces of the terminal and funnel cooperate to align the component in the vertical plane. The terminal has curved vertical sides which make only line contact with straight vertical walls in the funnel to deliberately allow limited, misalignment (±6°) between the components in the horizontal plane as the terminal is drawn into the funnel. Securing device is then installed between the misaligned components to lock them together in that position. A pull-in tool is provided which is lowered onto the base and includes a pull-in cable for drawing the terminal into the funnel and a device for installing the securing device which lock the components together.

15 Claims, 10 Drawing Sheets

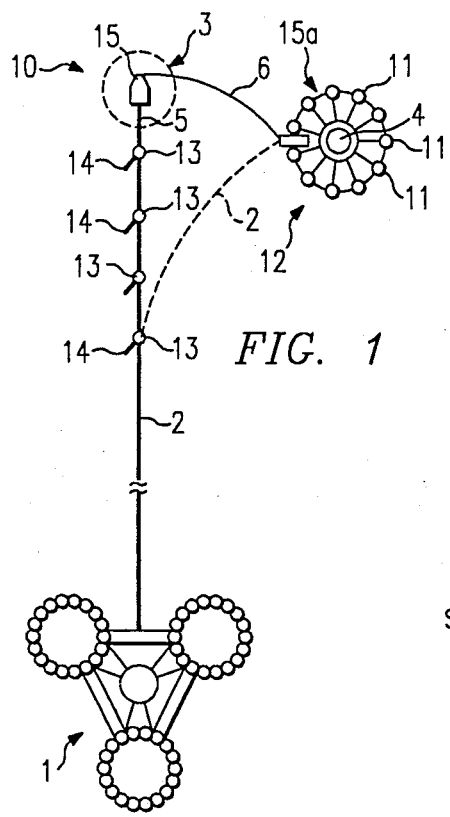
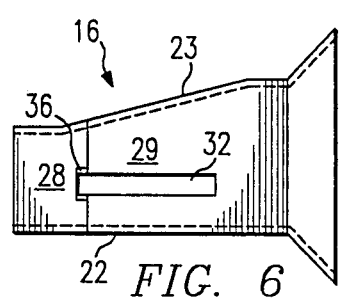
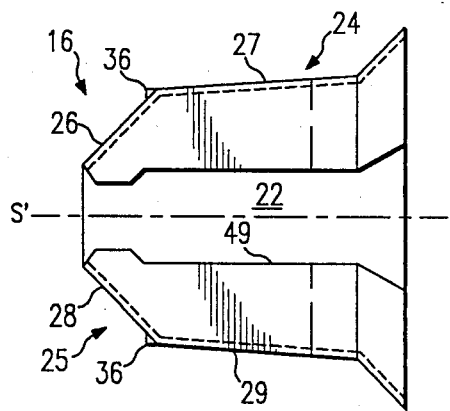
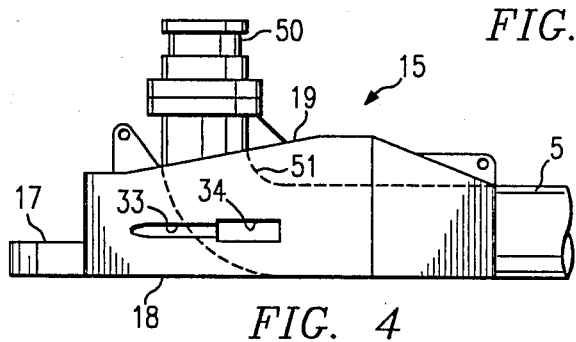
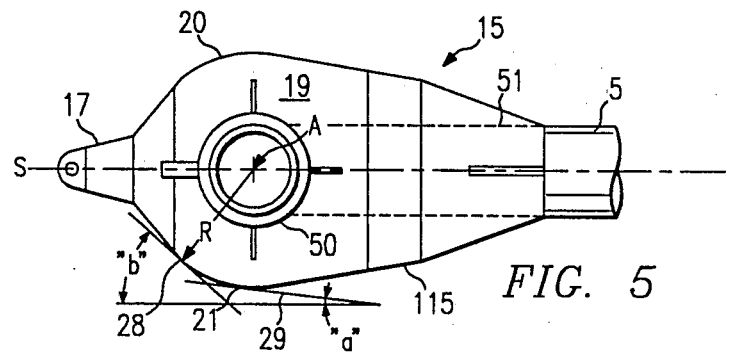

SUBSEA FLOWLINE CONNECTION SYSTEM

DESCRIPTION

1. Technical Field

The present invention relates to a subsea flowline connector system and more particularly relates to a pull-in system for connecting a submerged flowline to a base structure positioned on the sea bed which compensates for limited misalignment between the flowline and the base structure during the connecting operation.

2. Background Art

In producing hydrocarbon fluids from offshore deposits, it is often advantageous to use a single, bottom-supported, surface platform or a single production riser to handle the production from a plurality of submerged wells which, in turn, are spaced over a large area of the sea bed. The submerged walls are completed at locations remote from the platform/riser and may be produced individually or maybe grouped and handled through a submerged production satellite which is located near the remote wells. The produced fluids from the wells are flowed from the remote locations (e.g., production satellite) along the sea bed through submerged flowlines or flowline bundles to the platform/riser where the fluids are raised to the water's surface for further handling.

In such production systems, a major consideration lies in laying and installing of the submerged flowlines between the remote wells and the platform/riser.

As used herein, "flowline" refers both to individual flowlines and/or pipelines and to flowline/pipeline bundles which are comprised of a plurality of flowlines/pipelines which have been secured in bundles for ease of handling. Several methods have been proposed for installing submerged flowlines. For example, where a platform is already in place, the flowline is towed into a pre-determined corridor and connected to the platform. Buoys and drag chains are attached along the whole length, or along the length of the free end of the flowline providing it with neutral buoyancy. A terminal connector is affixed at the free end before it is submerged into a target area which is in close proximity to a base structure which, in turn, is affixed to the sea bed at the remote location. A pull-in line is payed out from the base structure and is connected to the terminal connector on the free end of the flowline which is floating just above the sea bed due to the neutral buoyancy thereof. The line is reeled in to sweep or pull the terminal connector, and hence the flowline, into an alignment funnel or the like on the base structure.

Ideally, the terminal connector on the flowline will smoothly enter and align within the funnel as it is drawn therein. Unfortunately, in actual operations, it is difficult to achieve exact and precise alignment between the terminal connector and the funnel since the terminal connector has a tendency to slightly rotate in the horizontal plane of the funnel as it is drawn into the funnel. This misalignment in the horizontal plane can cause the components to bind which then requires considerably larger forces to be applied to complete the final phase of the pull-in operation. This brute force approach in aligning the terminal connector within the funnel presents a real danger that "cold welding" may occur at the points of contact between the two, making final positioning and/or disconnection difficult, if not impossible, to achieve.

Further, the actual forces which may be required to fully mate the terminal connector within the alignment funnel are difficult to predict since the contact load and hence, the frictional forces due to this potential misalignment are unknown.

Calculations and tests have shown that in flowline connector systems of the type described above, the longitudinal axis of terminal connector on the end of the flowline may be misaligned with the longitudinal axis of the alignment funnel as much as ±6° in the horizontal plane. These results indicate that while it is desirable to prevent any substantial relative movement between the components in the vertical plane, it would be highly beneficial if the connection system could accept and compensate for the expected limited misalignment between the terminal connector and the funnel in the horizontal plane. By anticipating and providing for this misalignment, the means used to secure or lock the components together can be accurately designed to shear under predetermined loads so that the terminal connector can separate from the funnel when such loads are applied to the flowline thereby protecting the base structure piping and base structure from serious damage.

DISCLOSURE OF THE INVENTION

The present invention provides a subsea flowline connection system which compensates for limited misalignment in the horizontal plane as a submerged flowline is drawn into a connector base structure which, in turn, is positioned on the sea bed. Basically, the present connector system is comprised of a terminal connector which is adapted to be fixed to one end of a flowline and a connector base structure which is adapted to be positioned on the sea bed. The base structure has an alignment funnel thereon which is adapted to receive the terminal connector as it is drawn to the base structure by a pull-in cable. The external configuration of the terminal connector cooperates with the internal configuration of the funnel to prevent relative movement in the vertical plane while deliberately allowing limited relative misalignment in the horizontal plane as the terminal connector is drawn into the funnel. Securing means, e.g., bolts, are then installed into aligned recesses and slots in the terminal connector and funnel, respectively, to secure the two in a locked-down position.

In other words, in the present invention ideal alignment of the terminal connector within the alignment funnel is not attempted but instead the system is deliberately designed so that the terminal connector can rotate slightly in the horizontal plane as it is drawn into the funnel, if the situation so dictates, and can be locked within funnel even when the longitudinal axes of the terminal connector and the funnel are so misaligned. By permitting limited rotation between components in the horizontal plane, stresses on the flowline, once it is connected to the base structure, are substantially reduced over those normally present in previous known systems of this type.

More specifically, the subsea connection system of the present invention is comprised of a terminal connector and a connector base structure. The terminal connector is comprised of a housing having an inclined top surface, a horizontal bottom surface, and two curved vertical sides. A 90° elbow conduit is mounted in the housing with one end adapted to be fluidly connected to a submerged flowline and the other end extending vertically upward from the housing and terminating in a hub. A lug is affixed to the front of the housing to which a pull-in cable is to be attached.

The connector base structure is comprised of a frame having a plurality of guideposts extending vertically upward therefrom. An alignment funnel having a longitudinal axis is affixed to the frame and has a top inclined surface and a horizontal bottom surface which are adapted to cooperate with the inclined top surface and the horizontal bottom surface of the terminal connector to align the two components and to prevent relative movement therebetween in the vertical plane when the terminal connector is drawn into the funnel. The funnel has two vertical side walls, each of which is formed by two straight portions which incline inwardly at different angles.

The curved vertical sides of the terminal connector are curved to lie on a circle that has its center on the longitudinal axis of the vertically extending hub on the elbow conduit in the housing. The radius of the circle is such that each portion of each side wall of the funnel will be tangent to the circle when the terminal connector is fully received within the funnel. That is, the curved sides of the terminal connector will make only line contact with each portion of each wall of the funnel thereby allowing the longitudinal axis of the terminal connector to rotate slightly with respect to the longitudinal axis of the funnel in a horizontal plane about the center of the hub. Calculations and tests have shown that this rotation or misalignment between components to be on the order of $\pm 6°$ and the present system is designed accordingly.

The curved sides of the terminal connector and the walls of the funnels have recesses and slots, respectively, which align even though the components may be slightly misaligned in the horizontal plane. Securing means, e.g., bolts, are installed into the aligned recesses and slots and tightened to secure or lock the components together. Again, this may be accomplished even when the longitudinal axis of the components are misaligned in the horizontal plane. This permits the bolts to be designed to shear under predetermined loads to allow a controlled release of the flowline to thereby prevent serious damage to either the base structure piping or the base structure if such loads are applied to the flowline.

The alignment funnel has a slot running throughout the length of the inclined top slot thereof which extends along the longitudinal axis of the funnel. This slot is adapted to receive the hub on the elbow conduit as the terminal connector is drawn into the funnel. This accurately aligns and fixes the center of the hub with respect to the funnel which is important when the hub is later connected to another flow conduit at the base structure.

The terminal connector of the present invention prevents a favorable hydrodynamic design in that it does not unneccessarily introduce any hydrostatic or hydrodynamic instability in the flowline during tow-out or sweeping. Also, the cross-section of the terminal connector and the funnel provides automatic correction of any misalignment in the vertical plane as the terminal is pulled into the funnel. Further, the configuration of the present invention provides the lowest forces of contact during pull-in and alignment since only line contact is ever made between the curved sides of the terminal connector and the straight walls of the funnel.

The present invention further provides a pull-in tool that is adapted to be lowered onto the guideposts on the base structure for pulling the terminal connector into the funnel and for installing the securing means which lock the components together. This pull-in tool is comprised of a frame having a pull-in cable drum mounted thereon. The free end of the cable is routed from the drum and out the front of the tool, through the funnel on the base structure, and is adapted to be connected to the lug on the terminal connector by a releasable pin or the like. A means on the frame operates the drum to pay the cable out and in to draw the terminal connector and hence, the flowline, into the funnel.

A pair of carriages are pivotably mounted, one on either side of the frame of the pull-in tool. Each carriage includes a means for releasably holding a securing means, e.g., a bolt having a nut threaded thereon. When the pull-in tool is in an operable position, each carriage is moved inward to position the bolt carried thereby into an aligned recess and slot on the terminal connector and funnel, respectively. Torque means on the frame are then moved into engagement with the nuts on the bolts to tighten same to thereby lock the components together. The torque means and both carriages are then retracted and a means on the pull-in tool is actuated to release the pin connecting the cable to the terminal connector. The pull-in tool is then retrieved and the pull-in and lock-down operation is complete.

BRIEF DESCRIPTION OF THE DRAWINGS

The actual construction, operation, and apparent advantages of this invention will be better understood by referring to the drawings in which like numerals identify like parts and in which:

FIG. 1 is a plan view of a typical offshore production system in which the subsea flowline connection system of the present invention can be used;

FIG. 4 is a side view of the terminal connector of the present invention;

FIG. 5 is a top view of the terminal connector of FIG. 4;

FIG. 6 is a side view of the alignment funnel of the present invention;

FIG. 7 is a top view of the alignment funnel of FIG. 6;

BEST MODES FOR CARRYING OUT THE INVENTION

Figure 2:
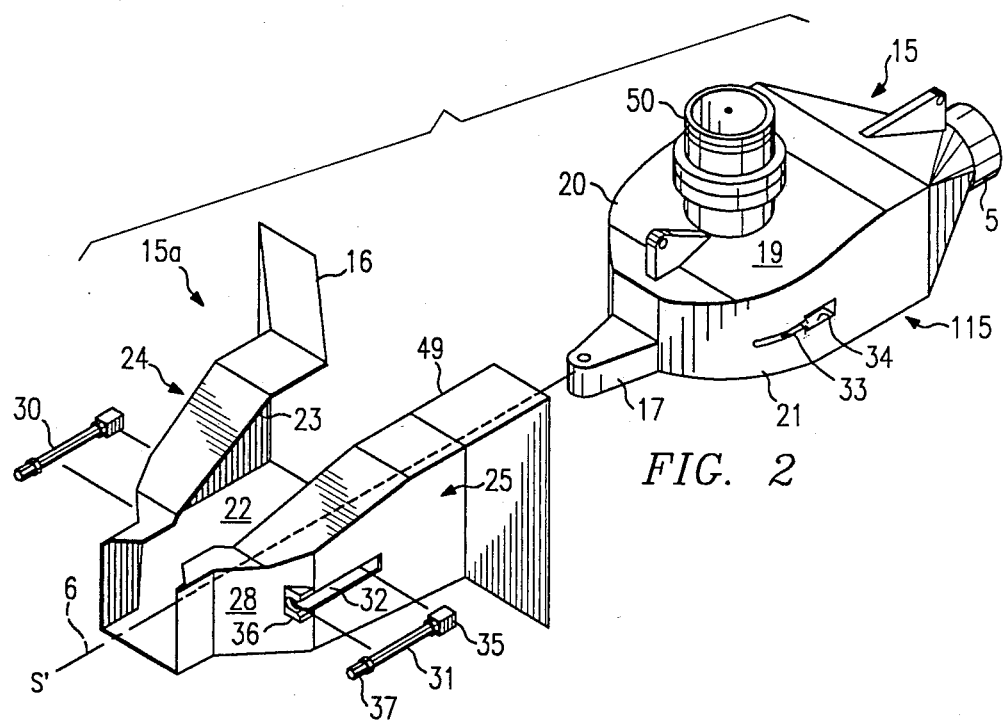
FIG. 2 is an exploded perspective view of the present subsea flowline connection system with the terminal connector of the system about to enter the alignment funnel of said system.

Referring more particularly to the drawings, FIG. 1 illustrates a plan view of a typical layout for producing hydrocarbons or the like at an offshore location in which the subsea flowline connection unit of the present invention can be used. As illustrated in FIG. 1, a plurality of remote, subsea production and/or injection wells 11 are completed through template 12 which is positioned on the sea bed. The production fluids from wells 11 are flowed into a submerged production satellite 4 which, in turn, is mounted at the center of template 12. For details of a typical satellite 4, see U.S. Pat. No. 4,442,900, issued Apr. 17, 1984. The fluids from wells 11 are combined and/or treated within satellite 4 and are then flowed to a production riser base (not shown) or to a bottom-supported structure (e.g., tri-column, gravity production/storage platform 1 in FIG. 1) via submerged flowline 2 which lies along the marine bottom or sea bed between satellite 4 and platform 1. As used herein, "flowline" refers both to individual flowlines and/or pipelines and to flowline/pipeline bundles which are comprised of a plurality of flowlines/pipelines which have been secured together for ease of handling.

The subsea flowline connection system 10 of the present invention is used in FIG. 1 to connect the free end 5 of flowline 2 to a base structure at satellite 4 as will be explained below. After installation into a predetermined corridor, one end of the flowline 2 is connected at platform 1. The other end of the flowline is maneuvered into a target area 3 which is in close proximity (e.g., 400 meters) of satellite 4. To allow the maneuverability required to effect the final installation at satellite 4, the whole flowline length or a part (e.g., 800 meters) of the free end 5 of the flowline 2 is provided with neutral buoyancy by attaching buoys 13 and drag chains 14 thereto, as will be understood in the art, before it is submerged at target area 3. This allows the submerged free end 5 of flowline 2 to "float" above and out of contact with the marine bottom during the pull-in operation.

Subsea flowline connector unit 10, which will be described in detail below, is comprised of a flowline terminal connector 15 which is affixed at the free end 5 of flowline 2 and a connector base structure 15a which is mounted on template 12 at satellite 4 in FIG. 1. A pull-in line or cable 6 is payed out from a pulldown tool (not shown in FIG. 1) at satellite 4 and is connected to terminal connector 15. When pull-in cable 6 is reeled in, terminal connector 15 on the free end 5 of the flowline is drawn into base structure 15a and is locked therein by securing means (not shown in FIG. 1) to thereby connect flowline 2 to the base structure at satellite 4.

Turning now to the details of the present invention, subsea flowline connection system 10 (FIGS. 2, 3) is comprised of flowline terminal connector 15 (FIGS. 4, 5) and base structure 15a (FIGS. 6, 7). As best seen in FIGS. 6, 7, base structure 15a is comprised of an alignment funnel 16 which may be mounted on or incorporated into a variety of support structures, some of which will be further described below. Funnel 16 is a box-like structure having basically a rectangular cross-section formed by a substantially horizontal bottom surface 22; an inclined top surface 23 which tapers downwardly away from the entry end of the funnel; and two vertical side walls 24, 25.

Each wall 24, 25 is formed of two straight portions which taper inwardly from the entry end of funnel 16 at two different angles relative to the longitudinal axis S' of funnel 16. That is, a first portion 27, 29 of walls 24, 25, respectively, taper inwardly at a first angle "a" (e.g., 6°) relative to axis S' (see FIG. 5) while a second portion 26, 28 of walls 25, 24, respectively, taper inwardly at a second angle "b" (e.g., 40°) with respect to axis S'. A slot 49 is provided throughout the length of top surface 23 and elongated openings 32 having shoulders 36 at one end thereof are provided in portions 27, 29 of vertical walls 24, 25 for purposes to be described below.

Terminal connector 15 (FIGS. 4, 5) is comprised of a housing 115 having basically a rectangular cross-section formed by a horizontal bottom surface 18; an inclined top surface 19 which tapers downward toward the nose or pulling end thereon; and two vertical side walls 20, 21, each of which have an elongated recess 33 therein which, in turn, has a shoulder 34 toward the rear thereof for a purpose described below. Housing 115 has an eye or lug 17 mounted at the nose thereof for attaching pull-in cable 6 (FIG. 1) thereto.

Flowline extension conduit 51 having a 90° elbow therein (represented by dotted lines in FIGS. 4, 5) is mounted in housing 115 and has a horizontal end fluidly connected to free end 5 of flowline 2 (FIG. 1) and a vertical end having a flowline connector hub 50 thereon.

Basically, the cross-section of terminal connector 15 conforms to the cross-section of funnel 16 except for one important aspect. Bottom surface 18 and inclined surface 19 on terminal connector 15 cooperate with bottom surface 22 and inclined surface 23, respectively, of funnel 16 to align the components and to prevent any rotational movement therebetween in a vertical plane. However, instead of terminal connector 15 having angularly tapered sides which would conform with angular tapered sides 24, 25 of funnel 16, sides 20, 21 of terminal 15 are curved along a portion thereof as best seen in FIG. 5. The outermost portion of each wall is curved at a radius R about a common center "A" which lies on the longitudinal axis of the vertical end of the elbow conduit 51 and hence, hub 50. Radius R is equal to the radius of a circle, having A as its center, which would touch a single point on portions 26, 27 and 28, 29 of walls 24, 25, respectively, of funnel 16 when terminal connector 15 is fully within funnel 16. The purpose of the curved portions of walls 20, 21 will become apparent from the following discussion.

The operation of subsea flowline connector unit 10 is as follows. Terminal connector 15 is fluidly connected to the free end 5 of a flowline so that any fluid flowed through the flowline will also flow through extension 51 and out hub 50. Alignment funnel 16 is positioned and affixed to any of several different support base structures as will be discussed in more detail below which, in turn, is positioned on the sea bed. A pull-in tool (described in detail below) is lowered onto the base structure. A pull-in cable 6 is payed out from the pull-in tool through funnel 16 and is connected to lug 17 on the nose of housing 115. Cable 6 is then reeled in to pull the nose of housing 115 into funnel 16.

As terminal 15 enters base structure 16, tapered surfaces 19, 23 on terminal 15 and funnel 16 cooperate to guide terminal 15 into substantially horizontal alignment within funnel 16 where bottom surfaces 18, 22 cooperates to fix terminal 15 against any movement in a vertical plane. However, as can be seen in FIG. 5, the curved side walls 20, 21 will only make line contact at single points (tangent to curved sides) on side walls 24, 25 of funnel 16 as terminal 15 is drawn therein instead of making full contact between the corresponding surfaces as would occur if the surfaces conformed to each other. This substantially reduces the force required to effect the final pulling in of terminal 15 and substantially eliminates the danger of binding and hence cold welding, at the points of contact between the surfaces.

As terminal 15 enters funnel 16, hub 50 of extension 51 enters slot 49 of funnel 16 is guided thereby along the longitudinal axis S' of funnel 26. Center A of hub 50 is always positioned on a vertical axis which passes through longitudinal axis S' of funnel 16 regardless of the horizontal orientation of axis S of terminal 15 with respect to axis S' of funnel 16 which may be misaligned by as much as ±angle c (e.g., 6°), see FIG. 3. Due to the construction of the present terminal 15 and funnel 16, the components can be secured or locked together by securing means, e.g., shear bolts 30, 31 (FIGS. 2, 3) even while the two components are at a maximum designed misalignment angle "c" (e.g., 6°). This allows shear bolts 30, 31 to be designed deliberately to break when a pre-determined force is applied to flowline 5, thereby releasing the flowline and preventing possible serious damage to the base structure piping and/or the base structure. With the basic components of subsea flowline connector system 10 having been described above, a more detailed description of a first embodiment of a base structure incorporating funnel 16 and the pull-in tool of present invention will now be set forth.

Referring to FIGS. 8-13, subsea base structure 38 is comprised of frame 39 which is assembled from sections of pipe or the like which have been welded or otherwise secured together. Pile sleeves 42, 43 are secured at either side of frame 39 and four spaced guideposts 45-48 extend upward from frame 39 near its center. Affixed at either end of frame 39 are alignment funnels 40, 41; each of which having basically the same construction as that of funnel 16 described above and having their longitudinal axes S' aligned with each other as shown.

In operation, base structure 38 is submerged onto the sea bed B at a remote location and is secured in place by piles (not shown) positioned through sleeves 42, 43, as will be understood in the art. Guidelines (only 54, 53 shown in FIGS. 10-13) are attached to guideposts 45-48 and extend upward to a work vessel (not shown) on the surface of the water. Pull-in tool 52, described in detail later, is lowered on the guidelines and is landed onto guideposts 45, 48 on base structure 38. Pull-in cable 6 from reel or drum 67 (in FIG. 17) on pull-in tool 52 is payed out through funnel 41 and is connected to lug 17 on terminal connector 15 which, in turn, is affixed to the free end of flowline 5. As described above, cable 6 is reeled in to draw terminal connector 15 into funnel 41. Securing means 30, 31 (not shown in FIGS. 8-13) are installed by pull-in tool 52 to secure terminal 15 in funnel 16.

Cable 6 is released from lug 17 and pull-in tool 52 is then retrieved to the surface, rotated, and then relowered on the guidelines to be landed on guideposts 45-48 with tool 52 now facing in the opposite direction. The pull-in operation is repeated through funnel 40 to draw a second flowline 5' (FIGS. 12, 13) into funnel 40 where it is secured as before. Pull-in cable 6 is released from flowline 5' and is retrieved to the surface. It will be understood that the center A of each hub 50 (FIG. 5) on terminal connectors 15 of both flowlines 5 and 5' will be precisely and accurately fixed on the longitudinal axis S' of funnels 40, 41 at a predetermined point in the horizontal plane once a terminal connector is secured within its respective funnel even though there may be some rotational misalignment of the longitudinal axis of the connector relative to the longitudinal axis of the funnel. With the centers A (i.e., vertical longitudinal axes of hubs 50) always being accurately positioned and fixed relative to each other, fluid communication between flowlines 5 and 5' is established by lowering a flowline connector component 55 on guidelines 53, 54 (FIGS. 12) after the pull-in tool has been retrieved. Component 55, as illustrated, is comprised of support frame 55a having a flowline section 58 (shown as a looped flowline section) secured thereto. As will be understood in the art, a hub connector 56, 57 is affixed at either end of section 58 which, in turn, mates with hubs 50 on flowlines 5', 5, respectively, when component 55 is landed on guideposts 45-48. The details of hub connectors 56, 57 form no part of the present invention and may be any of several known, available hub connectors, e.g., hydraulically-actuated, collet connectors; threaded connector, etc. When connectors 56, 57 are properly mated with their respective hubs 50, a sealed, fluid passageway is established between flowlines 5, 5' through flowline section 58.

Figure 14:
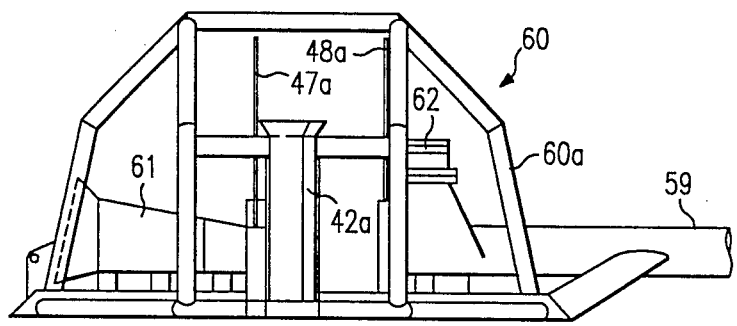
FIG. 14 is a side view of another embodiment of a base structure in accordance with the present invention.
Figure 15:
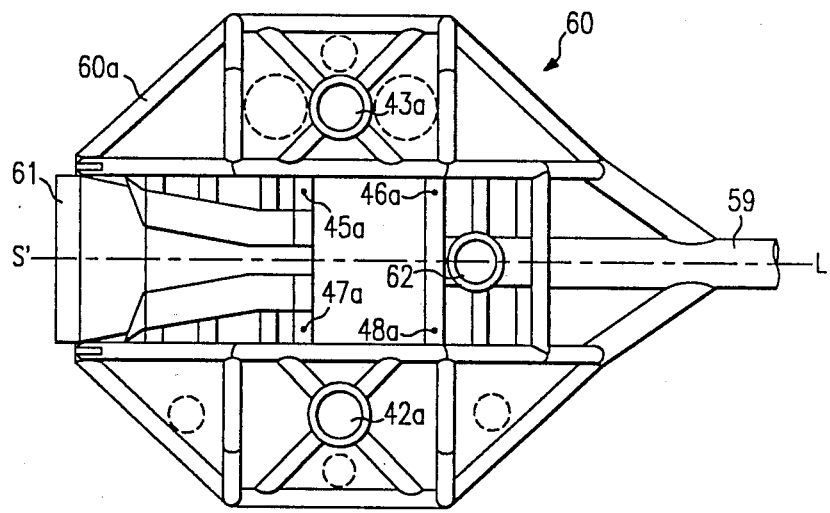
FIG. 15 is a top view of the base structure of FIG. 14.
Figure 16:
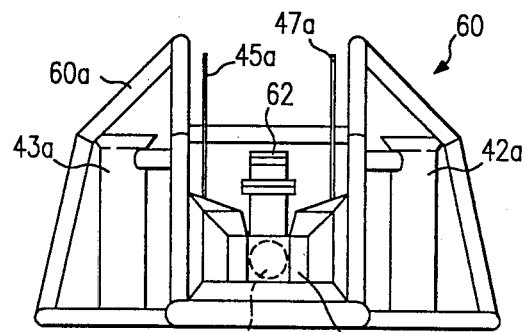
FIG. 16 is an end view of the base structure of FIG. 14.

FIGS. 14-16 disclose another subsea base structure 60 in accordance with the present invention. Base structure 60 is used for connecting an existing submerged flowline 59 to a second flowline (not shown) after base 60 has been secured on the sea bed. Base 60 is comprised of a frame 60a which has basically the same construction as frame 39 described above in that pile sleeves 42a, 43a and guideposts 45a-48a are mounted thereon in the same manner and for the same purposes as before. Flowline 59 having a vertical hub 62 at the end thereof is mounted on and affixed to frame 60a before base 60 is submerged and installed on the sea bed. Alignment funnel 61 is affixed in frame 60a and has its longitudinal axis S' aligned with the longitudinal axis L of the already attached flowline 59.

The operation using base 60 is basically the same as described above in relation to base 38. That is, base 60 is submerged with the end of flowline 59 connected thereto and is secured to the sea bed by piles (not shown) placed through sleeves 42a, 43a and into the sea bed. A pull-in tool (52 in FIGS. 10, 11) is lowered onto guideposts 45a–48b along guidelines (not shown). A pull-in cable is payed out through funnel 61 to a terminal connector on a flowline (not shown) and is then reeled in to effect a connection in the same manner as described above. The pull-in tool is retrieved and a flowline connector component (55 in FIGS. 12, 13) is lowered to fluidly connect flowline 59 on base 60 to the flowline (not shown) now connected to funnel 61.

Figure 25:
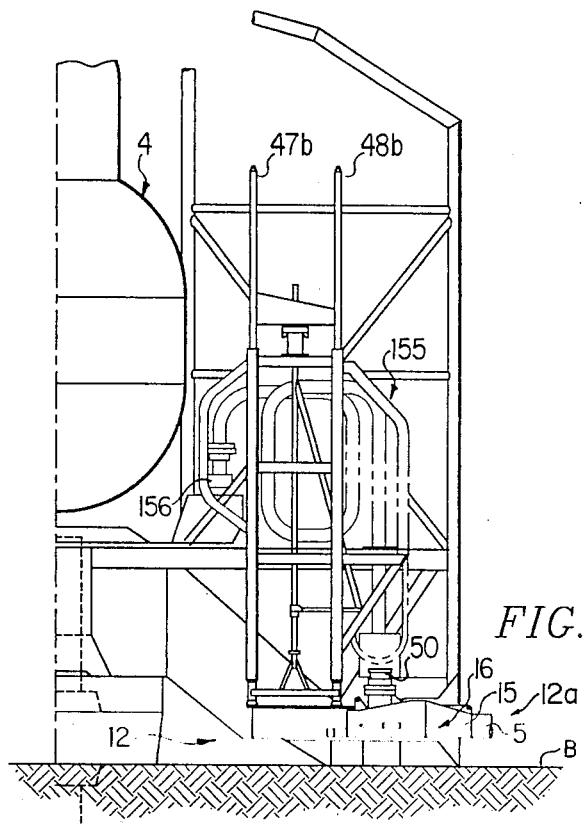
FIG. 25 is a partial side view of another embodiment of base structure of the present invention having a production satellite mounted thereon.
Figure 26:
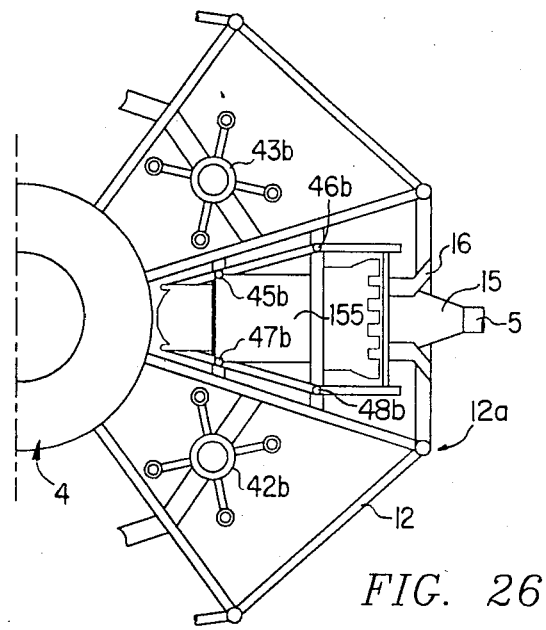
FIG. 26 is a top view of FIG. 25.

FIGS. 25 and 26 disclose still another subsea base structure 12a in accordance with the present invention. Base 12a is comprised of a template 12 of the type described in FIG. 1 in that a submerged production satellite 4 is mounted thereon. Template 12 has pile sleeves 42b, 43b for securing it to the sea floor and has guideposts 45b–48b extending therefrom. An alignment funnel 16 is affixed to template 12. The operation of base 12a is the same as described above. A pull-in tool (not shown in FIGS. 25–26) is landed on guideposts 45b–48b and a cable therefrom is used to pull terminal connector 15 on flowline 5 into funnel 16 where it is secured as described above. The pull-in tool is retrieved and a wellhead connector unit 155 is lowered to fluidly connect hub 50 of terminal 15 to penetrator 156 on satellite 4.

Figure 3:
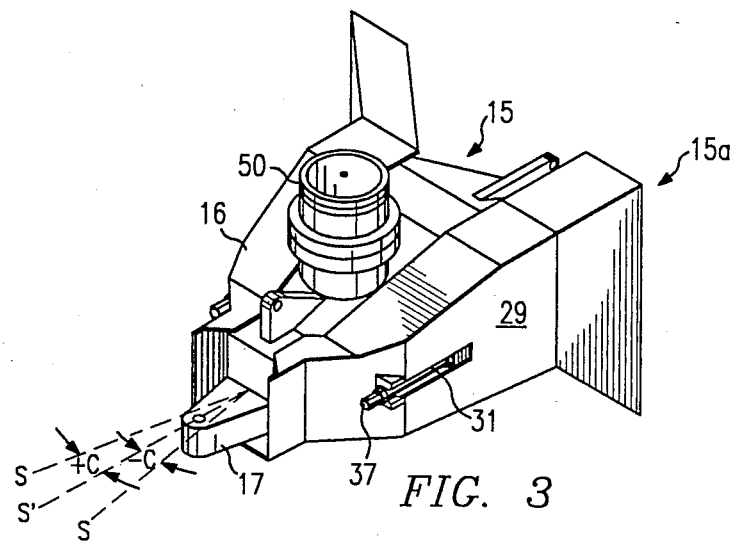
FIG. 3 is a perspective view of the present connection system with the terminal connector secured in the alignment funnel.
Figure 8:
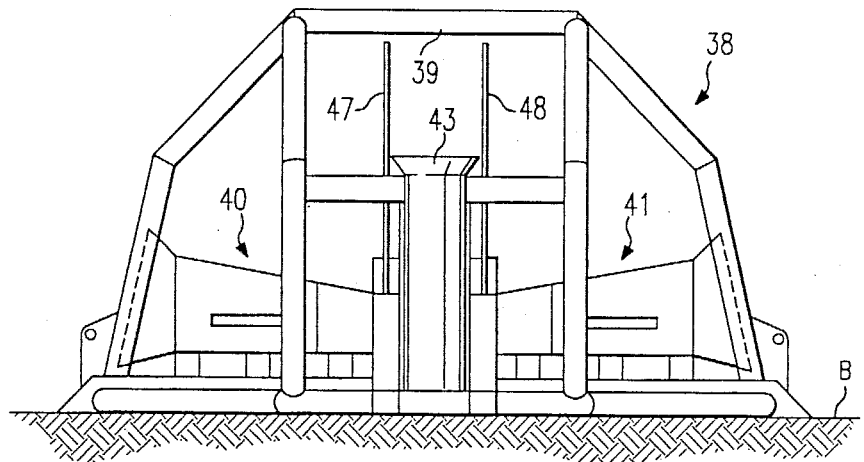
FIG. 8 is a side view of a base structure incorporating two alignment funnels to be used in connecting two flowlines thereto.
Figure 9:
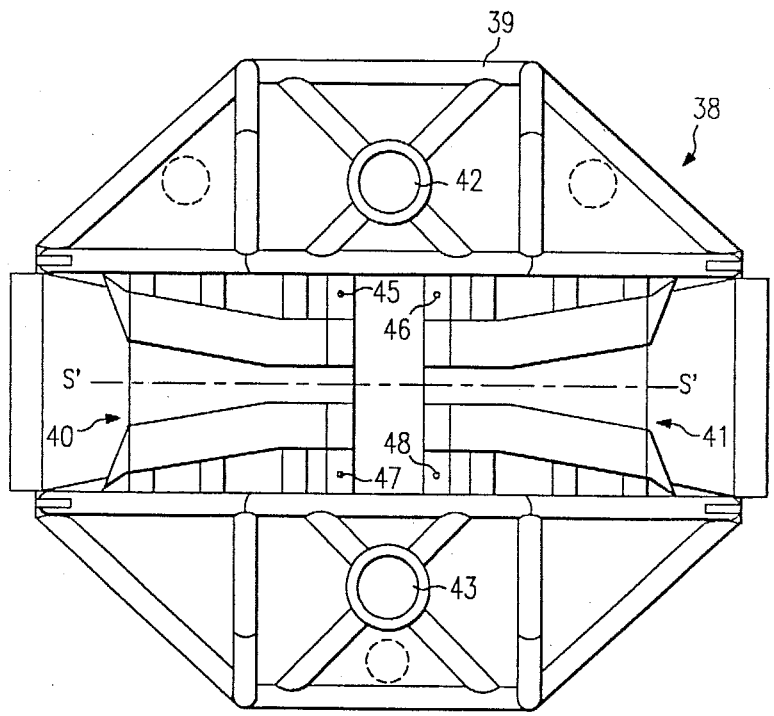
FIG. 9 is a top view of the base structure of FIG. 8.
Figure 10:
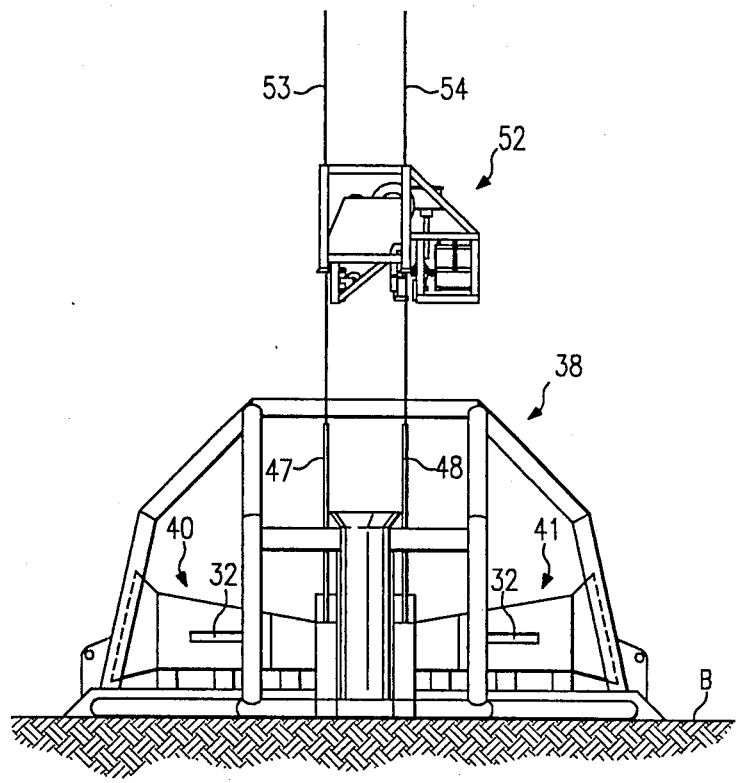
FIG. 10 is a side view of the base structure of FIG. 8 with the pull-in tool of the present invention being lowered thereto.
Figure 11:
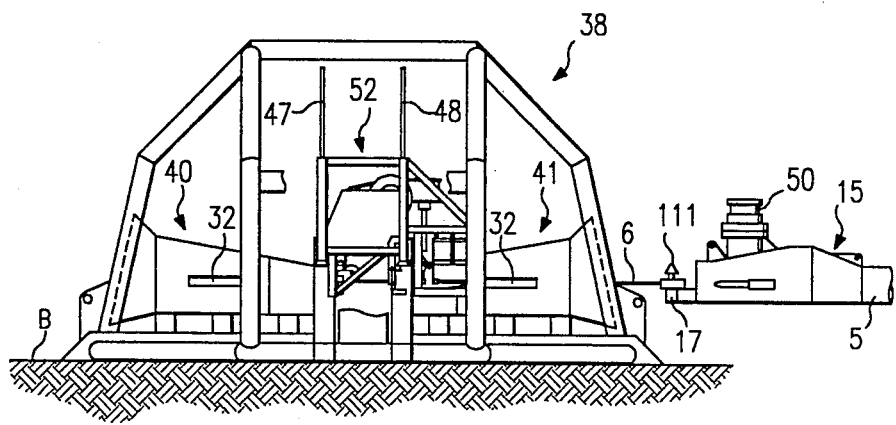
FIG. 11 is a side view similar to FIG. 10 with the pull-in tool in an operable position on the base structure.
Figure 12:
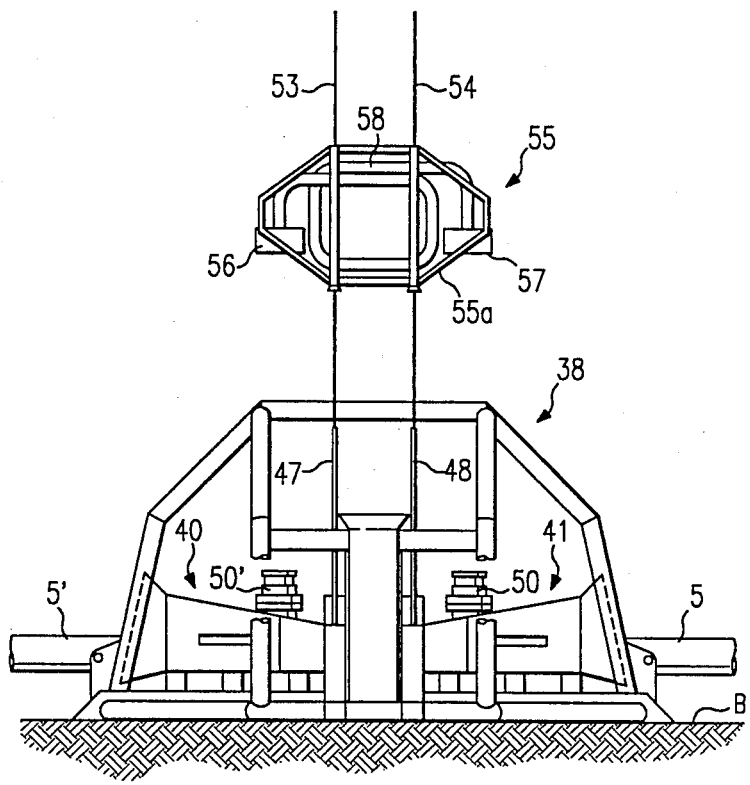
FIG. 12 is a side view of the base structure of FIG. 8 having two flowlines connected thereto and with a looped flowline connector being lowered thereto.
Figure 13:
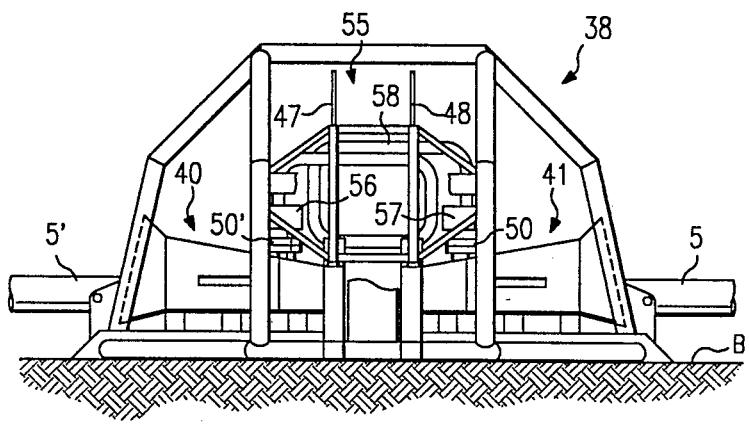
FIG. 13 is a side view similar to FIG. 12 with the looped flowline connector in an operable position.

In each of the operations described above, pull-in tool 52 is used to pull terminal connector 15 into an alignment funnel on a base structure where it is secured by securing means 30, 31 (FIG. 2). For the details of pull-in tool 52, reference is now made to FIGS. 17–24. Tool 52 is comprised of a frame 52a which is preferably constructed of steel beams welded together. Four guide sleeves 63, 64, 65, 66 are mounted on frame 52a and are adapted to cooperate with guidelines and guideposts 45–48 on the subsea base structure of the present flowline connector system.

Figure 19:
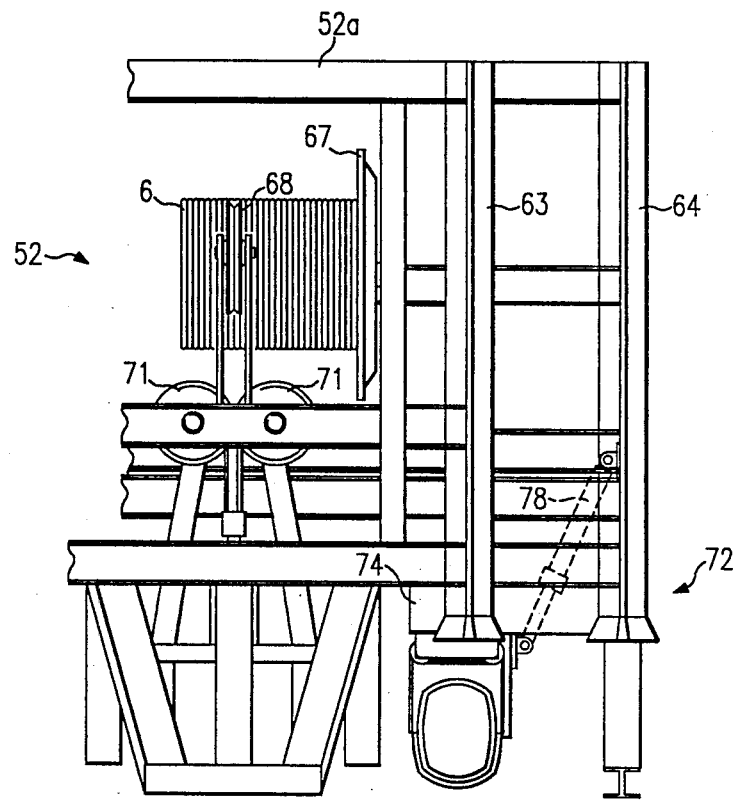
FIG. 19 is an end view, partly broken away, of the pull-in tool of FIG. 17.
Figure 17:
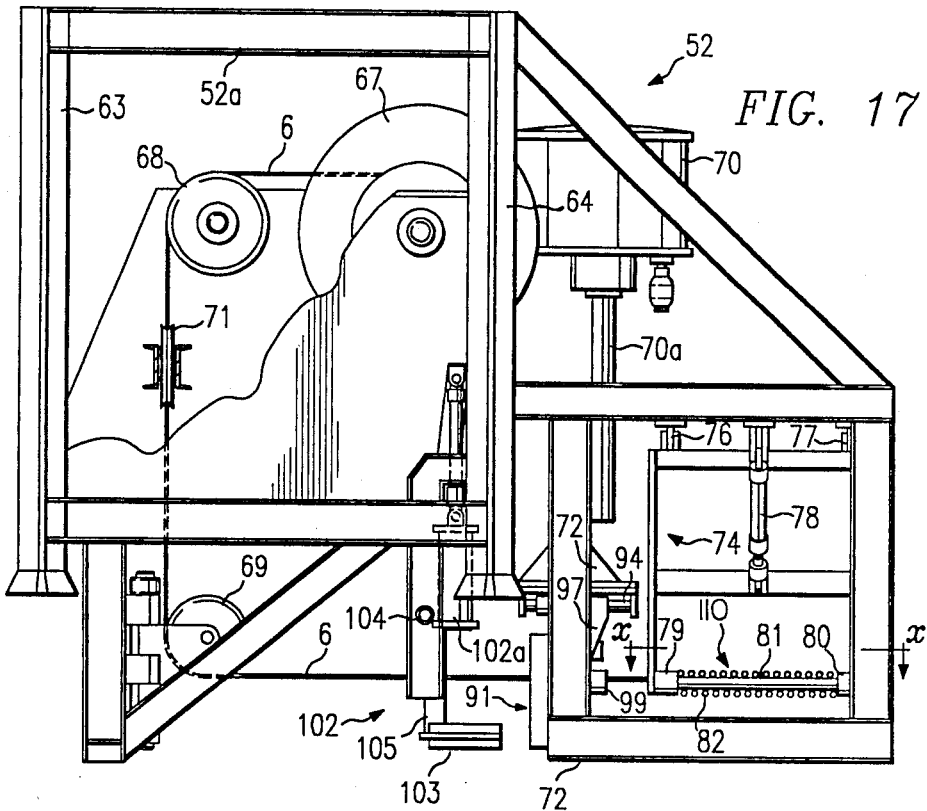
FIG. 17 is an enlarged side view of the pull-in tool of FIGS. 10 and 11.

Drum 67 is rotatably mounted substantially in the center of frame 52a and is driven in both a forward and a reverse direction by hydraulic powerpack 70 which in turn is operated by electric motor 70a (FIG. 17). Cable 6 (dotted lines in FIG. 17) is wound on drum 67 with the free end thereof being routed from drum 67 over sheaves 68 and 69 and out the front of frame 52a. To help stabilize cable 6, a pair of opposed, guide sheaves 71 are positioned between sheaves 68, 69 as shown in FIG. 19. As will be understood, cable 6 is payed out when drum 67 is rotated in a first direction and is reeled in when drum 67 is rotated in an opposite direction.

Figure 18:
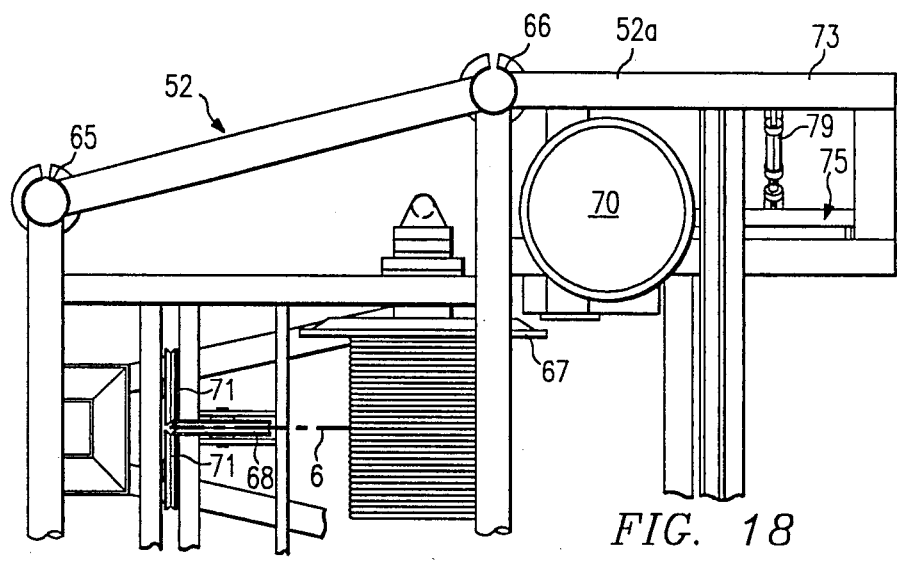
FIG. 18 is a top view, partly broken away, of the pull-in tool of FIG. 17.

As best seen in FIGS. 17 and 18, frame 52a is formed with two protruding supports 72, 73, one on either side of the lower front of frame 52a. Pivotably mounted in each support 72, 73 is a carriage 74, 75, respectively. Each carriage 74, 75 is adapted to carry and install securing means 31, 30 (FIG. 2) as will be fully described below. Since the construction of each carriage 74, 75 is basically the same, only that of carriage 74 will be described in detail.

Figure 20:
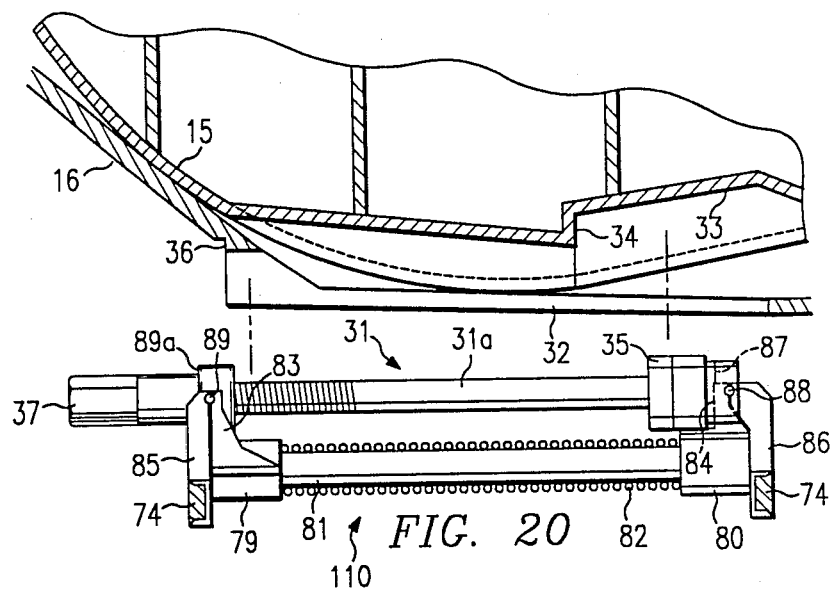
FIG. 20 is a sectional view taken along line X—X of FIG. 17 with the pull-in tool and the securing means in a first or unlocked position.
Figure 21:
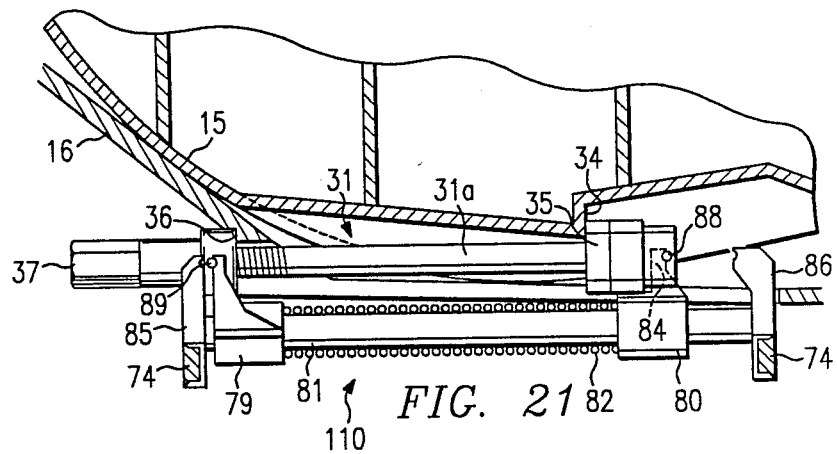
FIG. 21 is the same view as FIG. 20 with the pull-in tool and the securing means in a second or locked position.

Carriage 74 is comprised of an elongated frame which is pivotably secured to brackets 76, 77 on support 72 (FIG. 17). Carriage 74 is rotated about a horizontal axis (i.e., brackets 76, 77) by a hydraulic work cylinder 78 for a purpose described below. Positioned in the lower portion of carriage 74 is a means 110 for releasing holding securing means 31 in place until means 31 is installed in the present subsea flowline connector system 10. As best seen in FIGS. 20 and 21, means 110 is comprised of rod 81 having fork member 85 fixed at one end and arm 86 fixed at the other end, with both ends of rod 81 being fixed to carriage 74. Slidably positioned on rod 81 are sleeves 79, 80 which are biased away from each other by spring 82. Sleeve 79 has fork 83 fixed thereon and sleeve 80 has arm 84 fixed thereon.

Securing means 31 is comprised of threaded bolt 31a and nut 36 threaded thereon. Head 35 of bolt 31a has a vertical slot 87 therein having pin 88 passing transversely therethrough. Washer 89a is slidably mounted on the threaded end of bolt 31 and has pins 89 extending outward from either side thereof. To releasably hold securing means 31 in means 110, arm 87 on sleeve 80 is inserted into slot 87 on head 35 and pin 88 is positioned within cooperating recesses in arms 86, 88 on rod 81 and sleeve 80, respectively. Pins 89 on washer 89a are positioned in cooperating recesses on forks 85, 83 on rod 81 and sleeve 79, respectively. Spring 82 biases sleeves 79, 80 against fork 85 and arm 86 to firmly but releasably hold securing means 31 in place.

Figure 23:
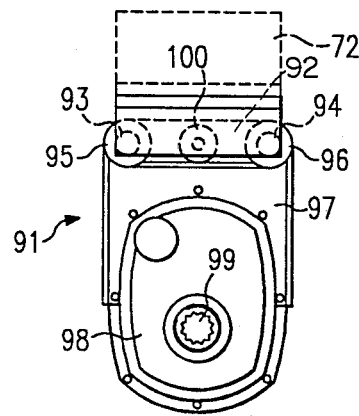
FIG. 23 is an enlarged end view of a torque means carried by the pull-in tool for tightening the securing means of FIG. 20.
Figure 24:
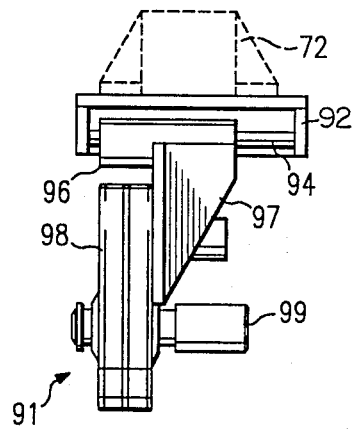
FIG. 24 is a side view of FIG. 23.

Also mounted on each supports 72, 73 of frame 52a is a torque means 91 (only one shown), respectively. The two torque means are basically identical in construction and each is positioned to cooperate with and tighten a respective securing means 31, 30 carried by carriages 74, 75, respectively. Referring now to FIGS. 23, 24, each torque means 91 is comprised of a hydraulic or electric drive motor 98 which is mounted on a bracket 97 which, in turn, has sleeves 95, 96, thereon which are slidably mounted on guide rods 93, 94, respectively which are affixed to support 92 on 72. A hydraulic cylinder 100 (FIG. 23 only) is positioned between rods 95, 96 and cooperates with bracket 97 to move torque means 91 to and fro on rods 95, 96. Socket 99 is attached to the output of motor 98 to be driven thereby.

In operation, terminal connector 15 is pulled into funnel 16 as described above. When in place, recesses 33 in terminal connector 15 will align vertically with respective slots 32 in funnel 15, even though the longitudinal axes of the two components may be slightly misaligned (±6°) in a horizontal plane (see FIG. 20). Hydraulic cylinders 78, 79 are actuated to rotate their respective carriages 74, 75 about their brackets to thereby move securing means 30, 31 into aligned slots 32 and recesses 33 on either respective side of funnel 16. Since the operation of securing means 30 and 31 are the same, only that of means 31 will be described in detail.

As securing means 31 is moved into position by carriage 74, head 35 of bolt 31a is positioned behind shoulder 34 of recess 33 and washer 39a is positioned behind shoulder 36 of slot 32. Torque means 91 is then moved forward by cylinder 100 whereby socket 99 engages nut 37. Actuation of torque means 91 threads nut 37 onto bolt 31a to draw head 35 and washer 89a tightly into contact with shoulders 34, 36, respectively, to thereby secure or lock terminal connector 15 within funnel 16. As seen in FIG. 21, contact between fork 83 and arm 87 with pins 89, 89, respectively, will cause sleeves 79, 80 to move toward each other against the bias of spring 82 as nut 37 is threaded onto bolt 31a.

Figure 22:
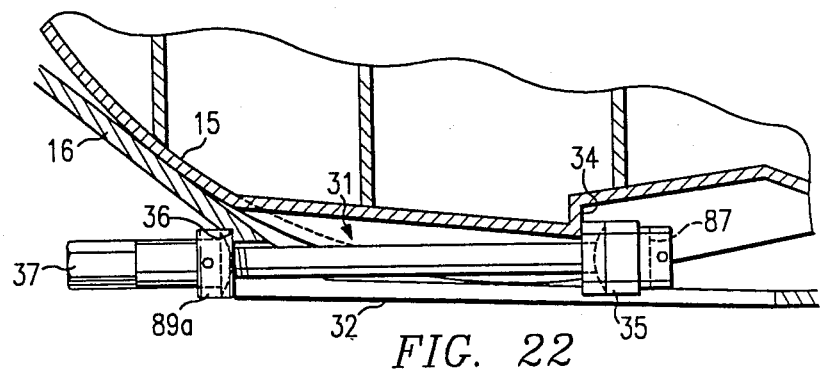
FIG. 22 is the same view of FIG. 21 with the securing means in a locked position and the pull-in tool removed.

When securing means 30, 31 has been fully tightened, cylinders 78, 79 are again actuated to rotate carriages 74, 75 in the opposite direction to return each to its original position. As this occurs, fork 83 and arm 84 are easily cammed out of contact with pins 89, 88 respectively, leaving means 30, 31 in a secured or "lockeddown" position (FIG. 22). Cable 6 is then released from lug 17 on terminal connector 15 and pull-in tool 52 is now free to be retrieved.

Preferably, cable 6 is secured to lug 17 of terminal connector 15 by a releasable pin 111 (FIG. 11) having what is commonly known as "fishneck" at its upper end. To pull such a pin, pull-in tool 52 (FIG. 17) has a pin release mechanism 102 mounted therein. Mechanism 102 is comprised of alignment fork 103 which is connected to "fishneck" connector 102a by bar 105 that is pivoted about shaft 104. As terminal 15 is drawn into funnel 16, it contacts alignment fork 103 so that when terminal 15 is in its final position within funnel 16, fishneck connection 102 will lie directly over the releasable pin. Connector 102a is then lowered (e.g., hydraulic cylinder, not shown) to engage the fishneck of the releasable pin whereupon upward movement of fishneck connector 102a will pull the releasable pin and thereby release cable 6 from lug 17. The pin is then retrieved with the pull-in tool.

What is claimed is:

1. A subsea flowline connection system comprising:
   a terminal connector adapted to be affixed to one end of a flowline; and
   a connector base structure adapted to be positioned on the sea bed at an offshore location; said base structure comprising an alignment funnel which is adapted to receive said terminal connector, the external configuration of said terminal connector cooperating with the internal configuration of said funnel to form a means for preventing relative movement in the vertical plane but to permit limited relative misalignment in the horizontal plane as said terminal connector is drawn into said alignment funnel; and
   securing means for locking said terminal connector within said alignment funnel.

2. A subsea flowline connection system comprising:
   a terminal connector having a top external surface and a bottom external surface and two rounded vertical sides; and
   a connector base structure comprising an alignment funnel, said funnel having a top internal surface and a bottom internal surface which cooperate with said top external surface and said bottom external surface, respectively, of said terminal connector when said terminal connector is fully within said funnel to form a means for preventing relative movement therebetween in a vertical plane; said funnel having two vertical internal walls formed by two straight portions on each vertical wall which incline inwardly at different angles whereby said rounded sides of said terminal connector make only line contact with said vertical walls of said funnel to thereby form a means for permitting limited misalignment therebetween in a horizontal plane as said terminal connector is drawn into said funnel.

3. The subsea flowline connection system of claim 2 including:
   a pair of recesses, one in each of said rounded sides of said terminal connector, each said recess having a shoulder at one end thereof; and
   a pair of slots, one in each of said vertical walls of said funnel, each said slot having a shoulder at one end thereof whereby each of said recesses is adapted to vertically align with each of said slots, respectively, when said terminal connector is fully within said alignment funnel; and
   securing means positioned within each said aligned recess and slot for securing said terminal connector within said funnel.

4. The subsea flowline connection system of claim 3 wherein each of said securing means comprises:
   a bolt having a head thereon; and
   a nut threaded on said bolt;
   and wherein said head of said bolt is adapted to engage said shoulder on said recess and said nut is adapted to engage said shoulder on said slot when said securing means is within its said aligned recess and slot.

5. The subsea flowline connection system of claim 3 including:
   a 90° elbow conduit mounted on said terminal connector having one end lying on a longitudinal axis thereof and adapted to be fluidly connected to the flowline affixed to said terminal connector and having another end extending vertically upward from said terminal connector; and
   a slot through said upper surface of said funnel extending along a longitudinal axis of said funnel and adapted to receive said another end of said elbow conduit when said terminal connector is received into said funnel.

6. The subsea flowline connection system of claim 5 wherein said connector base structure includes:
   a plurality of guideposts mounted on said connector base structure and extending upward therefrom and adapted to be connected to a plurality of guidelines which extend to the surface.

7. The subsea flowline connection system of claim 6 including:
   a pull-in tool adapted to be lowered onto said guideposts on said connector base structure, said pull-in tool comprising:
   a frame;
   a drum rotatably mounted on said frame;
   a cable on said drum and having a free end routed out the front of said frame, said cable adapted to be connected to said terminal connector;
   means for operating said drum to pay said cable in and out from said drum; and
   means for installing said securing means in said aligned slots and recesses to thereby secure said terminal connector in said funnel.

8. The subsea flowline connection system of claim 7 wherein said means for installing said securing means comprises:
   a carriage pivotably mounted on either side of said frame of said pull-in tool;
   means for releasably mounting said securing means in said carriage;
   means for rotating said carriage to thereby position said securing means into said aligned recess and slot on said terminal connector and funnel, respectively; and
   means for actuating said securing means to thereby secure said terminal connector within said funnel.

9. The subsea flowline connection system of claim 8 wherein said means for releasably mounting said securing means comprises:
   a rod mounted on said carriage;
   a first fork affixed at one end of said rod;
   an arm affixed at the other end of said rod;
   a first sleeve slidably mounted on said rod adjacent said one end of said rod;
   a second sleeve slidably mounted on said rod adjacent said other end of said rod;

a second fork affixed to said first sleeve and adapted to contact said first fork when said first sleeve is in a first position;

a second arm affixed to said second sleeve and adapted to contact said first arm when said second sleeve is in a first position; and means for biasing said first and second sleeves toward said first positions.

10. The subsea flowline connection system of claim 9 wherein said securing means comprises:

a bolt having a head thereon, said head having a vertical slot therein;

a first pin extending transversely of said slot in said head and adapted to be positioned and held between said first arm and second arm when said second sleeve is biased to said first portion;

a nut threaded onto said bolt;

a washer slidably mounted on said bolt adjacent said nut; and a pair of second pins, one extending from either side of said washer and each adapted to be positioned and held between said first fork and said second fork when said second sleeve is biased to said first position.

11. The subsea flowline connection of claim 10 wherein said means for actuating said securing means comprises:

a torque means;

means for slidably mounting said torque means in said frame of said pull-in tool whereby said torque means is moved to an operable position; and socket means driven by said torque means adapted to engage and tighten said nut when said torque means is moved to an operable position.

12. The subsea flowline connection system of claim 11 including:

means on said pull-in tool for releasing said cable from said terminal connector when said terminal connector is within said funnel.

13. The subsea flowline connection system of claim 12 including:

a second alignment funnel on said connector base structure with a longitudinal axis thereof aligned with the longitudinal axis of said alignment funnel.

14. A subsea flowline connection system comprising:

a terminal connector comprising a housing having a longitudinal axis and an inclined top surface, a horizontal bottom surface, and two vertical curved sides;

a 90° elbow conduit mounted in said housing with one end lying along said longitudinal axis of said housing and adapted to be fluidly connected to a flowline and with the other end extending vertically upward from said housing;

a connector base structure comprising a frame;

an alignment funnel having a longitudinal axis mounted on said frame; said funnel having a top inclined surface and a horizontal bottom surface adapted to cooperate with said top inclined surface and said horizontal bottom surface of said terminal connector when said terminal connector is received in said funnel to thereby form a means for preventing any relative movement in the vertical plane, said funnel having two vertical side walls, each formed of two straight portions which incline inwardly at different angles;

said curved sides of said terminal connector being curved to lie on a circle having its center on the longitudinal axis of said vertically extending other end of said elbow conduit and a radius wherein each straight portion of each side wall of said funnel is tangent to the circle when said terminal connector is fully received within said funnel whereby said curved sides of said terminal connector will make only line contact with said side walls of said funnel and thereby form a means for allowing limited rotational movement of said terminal connector within said funnel as defined by an angle formed between their respective longitudinal axes.

15. The subsea connection system of claim 14 wherein said angle is ±6°.

* * * * *